(12) United States Patent
Ishida

(10) Patent No.: US 7,542,725 B2
(45) Date of Patent: Jun. 2, 2009

(54) RADIO BASE STATION AND MOBILE STATION

(75) Inventor: Akira Ishida, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 313 days.

(21) Appl. No.: 09/781,585

(22) Filed: Feb. 13, 2001

(65) Prior Publication Data

US 2001/0014588 A1 Aug. 16, 2001

(30) Foreign Application Priority Data

Feb. 14, 2000 (JP) ............................... 2000-035971

(51) Int. Cl.
H04B 1/00 (2006.01)
H04B 7/00 (2006.01)
H04B 7/08 (2006.01)
H04B 1/06 (2006.01)

(52) U.S. Cl. .................... 455/69; 455/132; 455/140; 455/272

(58) Field of Classification Search ............. 455/69, 455/132, 133, 134, 135, 140, 272, 275, 277.1, 455/277.2, 500, 526; 375/347
See application file for complete search history.

(56) References Cited

U.S. PATENT DOCUMENTS

| | | | | |
|---|---|---|---|---|
| 5,319,795 A | * | 6/1994 | Hamabe et al. | 455/451 |
| 5,722,049 A | * | 2/1998 | Hassan et al. | 455/10 |
| 5,933,782 A | * | 8/1999 | Nakano et al. | 455/522 |
| 5,970,061 A | | 10/1999 | Kokudo | |
| 6,011,962 A | * | 1/2000 | Lindenmeier et al. | 455/226.1 |
| 6,600,907 B1 | * | 7/2003 | Taguchi | 455/132 |
| 2001/0023185 A1 | * | 9/2001 | Hakkinen et al. | 455/434 |

FOREIGN PATENT DOCUMENTS

| | | |
|---|---|---|
| JP | 02-276323 | 11/1990 |
| JP | 11-032030 | 2/1999 |

* cited by examiner

Primary Examiner—Eugene Yun
(74) Attorney, Agent, or Firm—McDermott Will & Emery LLP

(57) ABSTRACT

A radio base station, upon receipt of a traffic channel assignment request from a mobile station, creates a piece of traffic channel assignment information, attaches a diversity reception stop instruction to the information, and transmits the information with the diversity reception stop instruction to the mobile station as a response to the traffic channel assignment request.

3 Claims, 8 Drawing Sheets

FIG.5

LINK CHANNEL ASSIGNMENT MESSAGE

| OCTET | BIT | 8 | 7 | 6 | 5 | 4 | 3 | 2 | 1 |
|---|---|---|---|---|---|---|---|---|---|
| 1 | | RESERVED | 0 | 0 | 0 | 0 | 0 | 0 | 1 |
| 2 | | LCH TYPE | | | RESERVED | | EXTENDED LCH PROTOCOL TYPE | | |
| | | | | | MESSAGE TYPE | | | | |
| | | | | | RELATIVE SLOT NO. | | | | |
| 3 | | CC PROTOCOL | | D | | | | | |
| 4 | | CARRIER NO. | | | | | | | |
| 5 | | ABSOLUTE SLOT NO. | | | | | | | |

D=1; DIVERSITY RECEPTION STOP INSTRUCTION
D=0; DIVERSITY RECEPTION AVAILABLE

| SLOT2,6 | SLOT3,7 | SLOT4,8 |
|---------|---------|---------|
| PS1 | PS2 | PS3 |
| PS4 | — | — |
| — | — | — |
| — | — | — |

RADIO BASE STATION AND MOBILE STATION

BACKGROUND OF THE INVENTION (1) Field of the Invention

The present invention relates to a radio base station that communicates with a plurality of mobile stations with a space division multiplex, and relates to a mobile station.

(2) Description of Related Art

Recently, digital communication apparatuses transfer information by modulating a carrier with a digital information signal (baseband signal) to efficiently transfer data.

In digital communications, a multiple channel system is adopted to assign a plurality of users to the same frequency to efficiently use frequencies. This is achieved by improvements in the data transfer speed or development of the time division multiplex. In addition to the above techniques, a technique called space division multiplex is currently receiving attention. The space division multiplex enables a plurality of channels to be assigned to the same frequency at the same time using the adaptive array method.

In the adaptive array method, a radio wave is transmitted or received to/from a remote end in a certain direction by adaptively forming a directional pattern (also referred to as an array antenna pattern) using a plurality of antennas. The adaptive array method is described in detail in "Transactions on Adaptive Signal Processing in Space Domain and Applied Techniques" (The Transactions of the Institute of Electronics and Communication, Vol.J75-B-II, No.11, Nov.), and will not be detailed here.

In the space division multiplex, an adaptive-array radio base station communicates with a plurality of mobile stations simultaneously by forming a different directional pattern for each mobile station on each carrier of the same frequency simultaneously. The space division multiplex is also called Path Division Multiple Access (PDMA). The PDMA is described in detail in "PDMA Mobile Communication System" (Technical Report of Institute of Electronics, Information and Communication Engineers, RCS93-84(1994-01), pp37-44), and will not be detailed here.

When the space division multiplex is applied to a mobile communication system such as a portable telephone or a PHS (Personal Handyphone System) telephone, the radio base station needs to form an array antenna pattern for either of transmission and reception. This is because it is physically difficult for a mobile station to have an array antenna and because the mobile station's position and direction greatly changes due to its portability.

Meanwhile, many of recent portable telephones or PHS telephones have an embedded antenna in addition to a whip antenna to perform a diversity reception. It should be noted here that the diversity reception is divided into (1) the antenna selection diversity in which one out of a plurality of antennas that provides a reception signal with the highest reception level is selected and the signal is received through the selected antenna, and (2) the maximal-ratio combiner diversity in which received signals are weighted in proportion to each reception level and combined, and the combined signal is received.

However, there is a problem that when a space-division-multiplex base station uses the space division multiplex to communicate with a plurality of mobile stations performing the diversity reception, the communication quality deteriorates. The reason for this is thought that a positional difference between the whip antenna and the embedded antenna greatly affects reception of the array antenna pattern. More specifically, since many mobile stations use a whip antenna for transmission, the radio base station often points the array antenna pattern at a spatial position of the whip antenna. In this case, if the embedded antenna is located at such a position as is interfered with an array antenna pattern for another mobile station, the embedded antenna may be selected by mistake since the diversity reception selects an antenna based on only the reception signal level. This leads to deterioration of the communication quality (e.g., increase in the bit error rate).

SUMMARY OF THE INVENTION

It is therefore an object of the present invention to provide a radio base station that prohibit deterioration of communication quality due to a diversity reception at a mobile station, and to provide a mobile station for this purpose.

The above object is fulfilled by a radio base station for performing a radio communication with a plurality of mobile stations with a space division multiplex method, the radio base station being characterized by: transmitting an instruction to stop performing a diversity reception to a mobile station which the radio base station is to communicate with by the space division multiplex method.

With the above construction, the radio base station transmits the diversity reception stop instruction to each mobile station which the radio base station is to communicate with by the space division multiplex method. Upon receipt of the diversity reception stop instruction, each mobile station stops the diversity reception and performs a reception using one antenna. This prohibits deterioration of communication quality due to the diversity reception at the mobile station.

Also, the mobile station does not receive the diversity reception stop instruction from ordinary radio base stations that do not perform the space division multiplex. As a result, the mobile station improves the communication quality for both ordinary and present-invention radio base stations. That is to say, the mobile station improves the communication quality by the diversity reception in the case of ordinary radio base stations, and by the one-antenna reception with an array antenna pattern in the case of the radio base station of the present invention.

The above radio base station may comprise: a creation means for creating a piece of traffic channel assignment information after receiving a traffic channel assignment request from a mobile station; an attachment means for attaching the diversity reception stop instruction to the piece of traffic channel assignment information; and a transmission means for transmitting the piece of traffic channel assignment information with the diversity reception stop instruction, to the mobile station as a response to the traffic channel assignment request.

With the above construction, the diversity reception stop instruction is transmitted together with the traffic channel assignment. This allows the mobile station to stop the diversity reception at the same time it starts a communication through a traffic channel.

The above radio base station may also comprise: a determination means for determining, after receiving a traffic channel assignment request from a mobile station, whether to allow the mobile station to space-division-multiplex with another mobile station which has communicated with the radio base station; a creation means for creating a piece of traffic channel assignment information when the determination means determines to allow the mobile station to space-division-multiplex with the other mobile station; an attachment means for attaching the diversity reception stop instruction to the piece of traffic channel assignment information; and a transmission means for transmitting the piece of traffic channel assignment information with the diversity reception stop instruction, to the mobile station as a response to the traffic channel assignment request, and transmitting the diversity reception stop instruction to the other mobile station through a traffic channel.

With the above construction, the mobile station stops the diversity reception at the same time it starts the space division multiplex.

The above object is also fulfilled by a mobile station for performing a diversity reception, the mobile station having a plurality of antennas and comprising: a judgement means for judging whether a diversity reception stop instruction has been received from a radio base station; and a stop means for stopping the diversity reception when the judgement means judges that a diversity reception stop instruction has been received.

With the above construction, upon receipt of the diversity reception stop instruction, the mobile station stops the diversity reception and performs a reception using one antenna. This prohibits deterioration of communication quality due to the diversity reception at the mobile station.

Also, the mobile station does not receive the diversity reception stop instruction from ordinary radio base stations that do not perform the space division multiplex. As a result, the mobile station improves the communication quality for both ordinary and present-invention radio base stations. That is to say, the mobile station improves the communication quality by the diversity reception in the case of ordinary radio base stations, and by the one-antenna reception with an array antenna pattern in the case of the radio base station of the present invention.

The above mobile station may further comprise: a reception means for receiving a piece of traffic channel assignment information from the radio base station as a response to a traffic channel assignment request sent to the radio base station, wherein the judgement means judges whether the diversity reception stop instruction has been attached to the received piece of traffic channel assignment information.

With the above construction, the diversity reception stop instruction is transmitted together with the traffic channel assignment. This allows the mobile station to stop the diversity reception at the same time it starts a communication through a traffic channel.

In the above mobile station, the judgement means may further judge whether data received by the reception means through a traffic channel includes the diversity reception stop instruction.

With the above construction, the diversity reception stop instruction is transmitted through a traffic channel. This allows the radio base station to transmit the stop instruction with a more flexible timing, enabling to stop the diversity reception as circumstances demand.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 is a block diagram showing the construction of the user processing unit 51a;

FIG. 5 shows an example of a link channel assignment message;

DESCRIPTION OF THE PREFERRED EMBODIMENTS

In the present embodiment, the radio base station performs a radio communication with one or more mobile stations by forming an array antenna pattern using a plurality of antennas. In the present embodiment, it is assumed that the radio base station is a PHS (Personal Handyphone System) base station which performs a radio communication with a PHS telephone according to a TDMA/TDD (Time Division Multiple Access/Time Division Duplex) method conforming to a PHS standard. The radio base station performs the space division multiplex, as well as the time division multiplex. In performing the space division multiplex, the radio base station instructs a mobile station which the radio base station is to newly communicate with by the space division multiplex, to stop the diversity reception.

Construction of Radio Base Station

Figure 1:
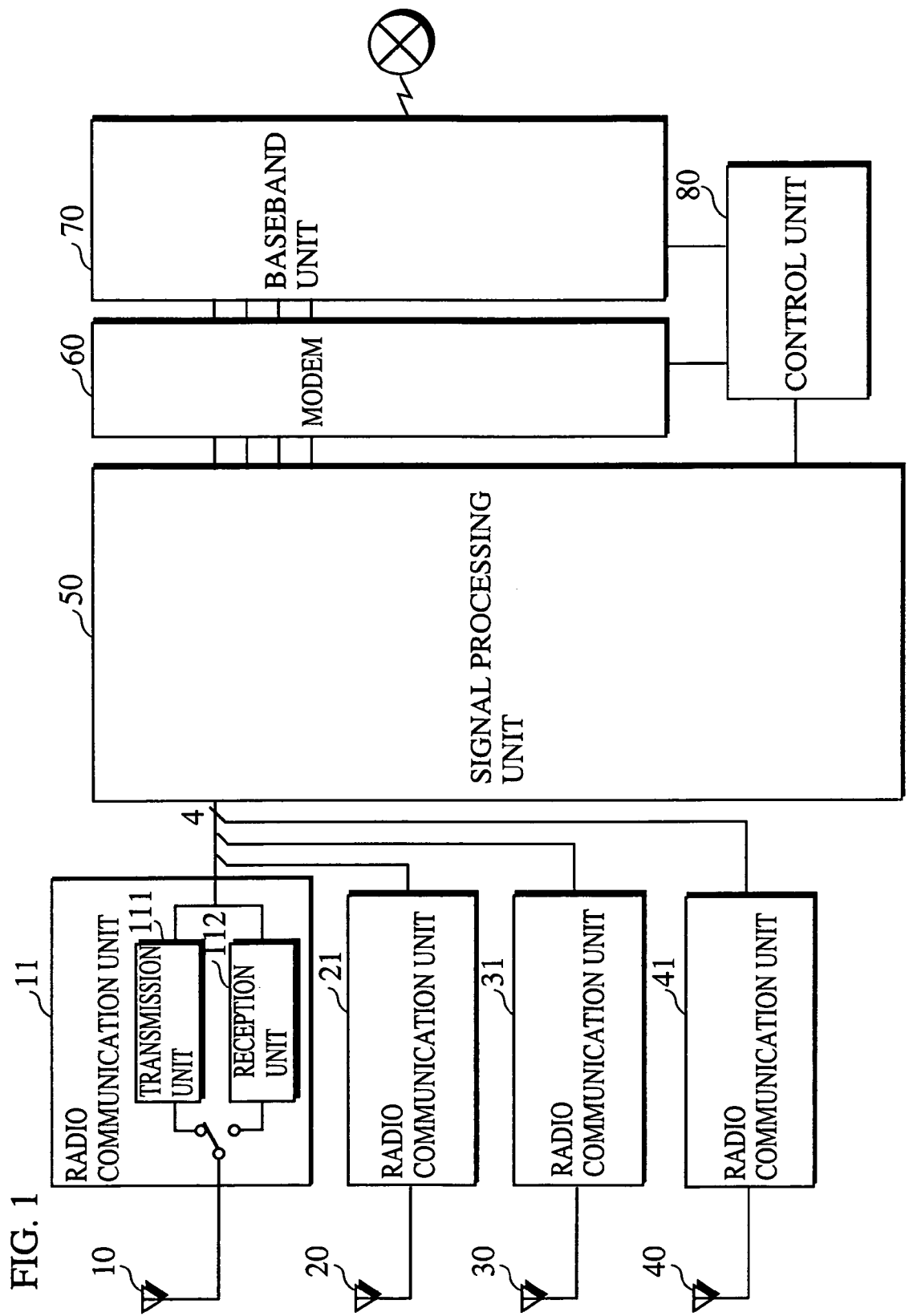
FIG. 1 is a block diagram showing the construction of the radio base station in the embodiment.

FIG. 1 is a block diagram showing the construction of the radio base station in the present embodiment. As shown in FIG. 1, the radio base station includes a baseband unit 70, a modem unit 60, a signal processing unit 50, radio communication units 11, 21, 31, and 41, antennas 10, 20, 30, and 40, and a control unit 80.

The baseband unit 70 performs a TDMA/TDD process for each signal to be transmitted by the space division multiplex. In the TDMA/TDD process, a plurality of signals (baseband signals representing audio data or other data) to be transferred between the modem unit 60 and a plurality of lines connected via a public switched telephone network are multiplexed or separated into/from TDMA/TDD frames. It should be noted here that a TDMA/TDD frame has a period of 5 mS and is divided into eight equal time slots, namely four transmission time slots and four reception time slots. More specifically, the baseband unit 70 multiplexes signals from the plurality of lines into each TDMA/TDD frame for the time division multiplex, multiplexes the signals from the plurality of lines into each transmission time slot for the space division multiplex, and outputs four signals at the maximum to the modem unit 60 for each transmission time slot for space division multiplex. The baseband unit 70 inputs four signals at the maximum by the space division multiplex from the modem unit 60 for each reception time slot, and demultiplexes each received TDMA/TDD frame into signals and outputs the signals to the plurality of lines.

The modem unit 60 modulates signals input from the baseband unit 70, and demodulates signals input from the signal processing unit 50. The π/4-shift QPSK is used as a modulation/demodulation method.

The signal processing unit 50 calculates parameters for array transmission/reception using the antennas 10 to 40 as one array antenna. It should be noted here that the array transmission/reception is a transmission/reception which is performed by forming an array antenna pattern. The parameters here are weighting factors used for adjusting amplitude and phase of each signal to be transmitted or received from/to the radio communication unit 11, 21, 31, or 41, during the space division multiplex. That is to say, an array antenna pattern for one mobile station is formed by assigning weights to transmission/reception signals of the radio communication unit 11, 21, 31, or 41 when a plurality of signals are transmitted or received at the same time through a plurality of antennas. More specifically, the signal processing unit 50 calculates parameters according to each signal received by the radio communication units 11, 21, 31, and 41, assigns the calculated parameters as a weight to each reception signal. This forms a directional pattern at a reception. The signal processing unit 50 also assigns the calculated parameters as a weight to each signal transmitted by the radio communication units 11, 21, 31, and 41. This forms a directional pattern at a transmission.

The radio communication units 11, 21, 31, and 41, during array transmissions, convert signals weighted by the signal processing unit 50 into RF (Radio Frequency) signals and transmit the RF signals through the antennas 10 to 40, and during array reception, convert signals received through the antennas 10 to 40 into baseband signals and output the baseband signals to the signal processing unit 50. During an omni transmission/reception, only the radio communication unit 11 operates as described above, and the other radio communication units 21, 31, and 41 stop operating. It should be noted here that the omni transmission/reception is a transmission/reception performed with a omnidirectional pattern using one antenna, without forming an array antenna pattern.

The control unit 80 controls the entire radio base station by controlling the signal processing unit 50, modem unit 60, and baseband unit 70. Upon receipt of a traffic channel (TCH) assignment request (also referred to as a link channel establishment request, hereinafter "link channel" is referred to as "Lch") from a mobile station via the radio communication units 11, 21, 31, 41, signal processing unit 50, modem unit 60, and baseband unit 70, the control unit 80 selects an unassigned traffic channel and transmits to the mobile station an Lch assignment message that indicates that the selected traffic channel is assigned. The control unit 80 transmits a diversity reception stop instruction to the mobile station together with the Lch assignment message via the radio communication units 11, 21, 31, 41, signal processing unit 50, and modem unit 60.

The Lch establishment request is issued for requesting a link and an assignment of a traffic channel and is transmitted from a mobile station to the radio base station through a control channel (also referred to as CCH) to change to a traffic channel during a position registration, a call-out, a call-in, a hand-over, or a channel change. An Lch establishment re-request, which is similar to the Lch establishment request, is also used. The Lch establishment re-request is transmitted from a mobile station to the radio base station due to, for example, occurrence of a time-out after the Lch establishment request. An Lch assignment includes a frequency number and a slot number and is transmitted from the radio base station to a mobile station, wherein the frequency number and the slot number are used to specify a traffic channel to be assigned.

The control unit 80 instructs the signal processing unit 50 to perform the omni transmission/reception for the control channels and to perform the array transmission/reception for the traffic channels.

Construction of Signal Processing Unit 50

Figure 2:
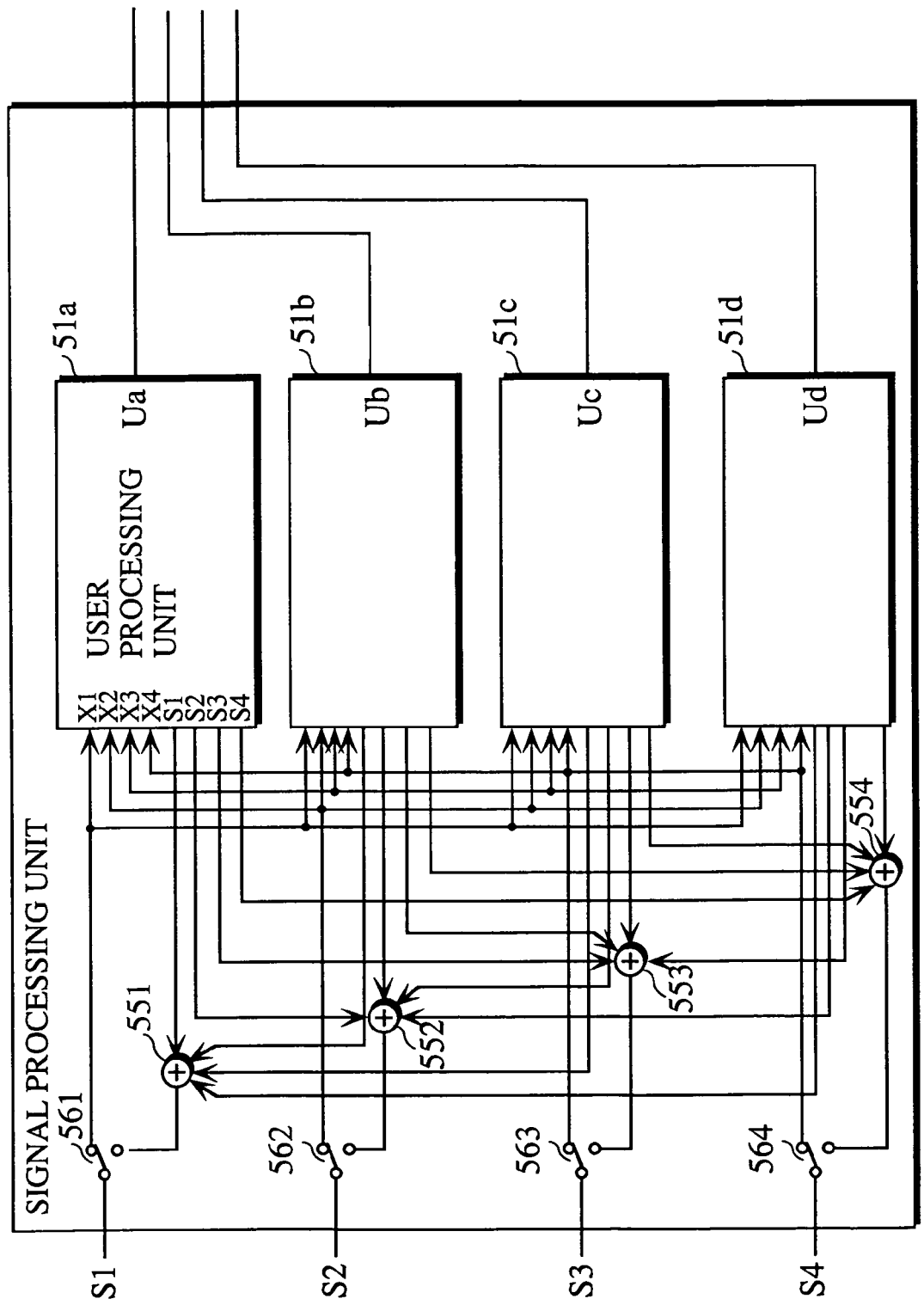
FIG. 2 is a block diagram showing the construction of the signal processing unit 50.

FIG. 2 is a block diagram showing the construction of the signal processing unit 50. The signal processing unit 50 includes user processing units 51*a* to 51*d*, adders 551 to 554, and transmission/reception switches 561 to 564. When receiving an instruction to perform the array transmission/reception from the control unit 80, the signal processing unit 50 calculates weighting factors and assigns the calculated weighting factors; and when receiving an instruction to perform the omni transmission/reception, the signal processing unit 50 allows only the user processing unit 51*a* to operate, prohibiting the user processing units 51*b* and 51*c* from operating.

The user processing units 51*a* to 51*d* correspond to four user signals to be transmitted by the space division multiplex for each time slot. Each user processing unit calculates the earlier-described weighting factors for a reception time slot, and extracts a user signal by using the weighting factors to combine reception signals input from the radio communication units 11 to 41 through switches 561 to 564. Each user processing unit assigns the weighting factors to the user signal for a transmission time slot, and outputs the weighted user signal to each radio communication unit.

The user processing unit 51*a* does not assign weights in the case of the omni transmission, and outputs a signal from the modem unit 60 to the radio communication unit 11, as it is, via the adder 551 and switch 561.

The adder 551 combines weighted components of each user transmission signal output to the radio communication unit 11. The adders 552 to 553 operate in the same way as the adder 551, but differ from the adder 551 in that they correspond to the radio communication units 21 to 41, respectively.

Construction of User Processing Unit

The user processing units 51*a* to 51*d* have the same construction. In the following description, the user processing unit 51*a* is used as an example.

Figure 3:
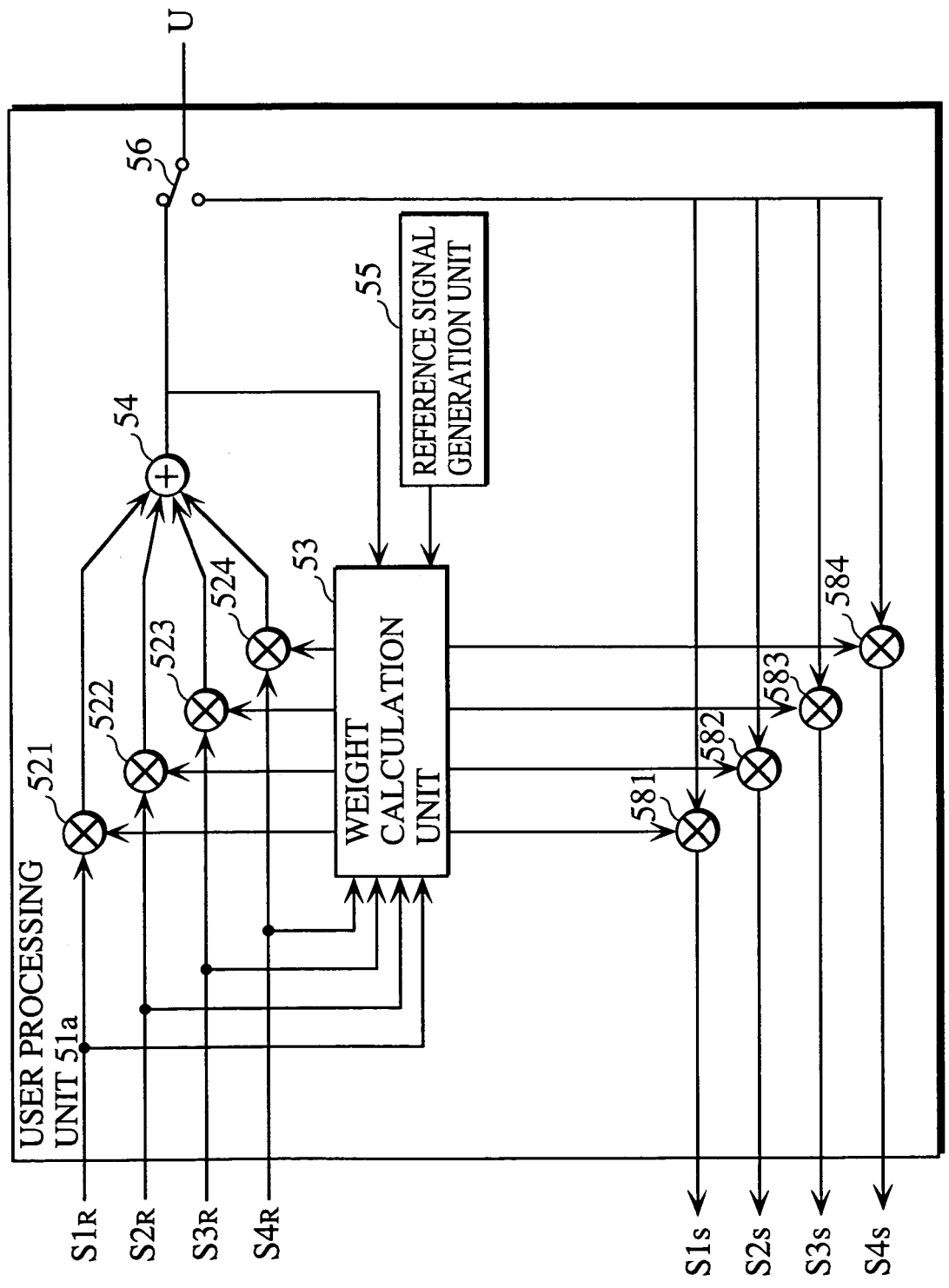

FIG. 3 is a block diagram showing the construction of the user processing unit 51*a*. The user processing unit 51*a* includes a weight calculation unit 53, an adder 54, a reference signal generation unit 55, a switch 56, multipliers 521 to 524, and multipliers 581 to 584.

The weight calculation unit 53 calculates weighting factors so that a sum of differences between (a) each reception signal S1R to S4R received respectively from the radio communication units 11 to 41 and (b) the reference signal generated by the reference signal generation unit 55 becomes a minimum. It should be noted here that the reference signal is symbol data in a period of a known fixed bit pattern (fixed symbols) included in a control signal for a control channel or in a communication signal for a traffic channel. More specifically, fields R (Ramp bits), SS (Start Symbol), PR (Preamble), and UW (Unique Word) are known fixed bit patterns. These fields can be used as reference signals. Also, the control signal includes a call-out identification code and a call-in identification code which are known. These identification codes are defined in the PHS standard, and will not be detailed here.

The weight calculation unit 53 outputs the calculated weighting factors for a reception time slot to the multipliers 521 to 524 during the symbol period during which the weighting factors are calculated, or in one of the succeeding symbol periods.

The weight calculation unit 53 outputs the calculated weighting factors to the multipliers 581 to 584 using a succeeding transmission time slot that corresponds to the reception time slot for which the weighting factors are calculated.

The reference signal generation signal 55 outputs symbol data to be a reference signal in synchronization with the symbol timing through a reception time slot for a control channel; and outputs symbol data to be a reference signal to the weight calculation unit 53 in synchronization with the symbol timing through a reception time slot for a traffic channel.

The multipliers 521 to 524 assign the weighting factors output from the weight calculation unit 53 to the reception signals X1 to X4 output from the radio communication units 11 to 41, for reception time slots.

The adder 54 combines the signals weighted by the multipliers 521 to 524 into one signal. The composite signal represents a reception symbol for user "a" extracted from the four space-division-multiplexed reception signals received from users "a" to "d", wherein four is the maximum number and the number may be less.

The multipliers 581 to 584 assign the weighting factors output from the weight calculation unit 53 to a transmission symbol for user "a" for each of the radio communication units 11 to 41.

Lch Assignment

Figure 4:
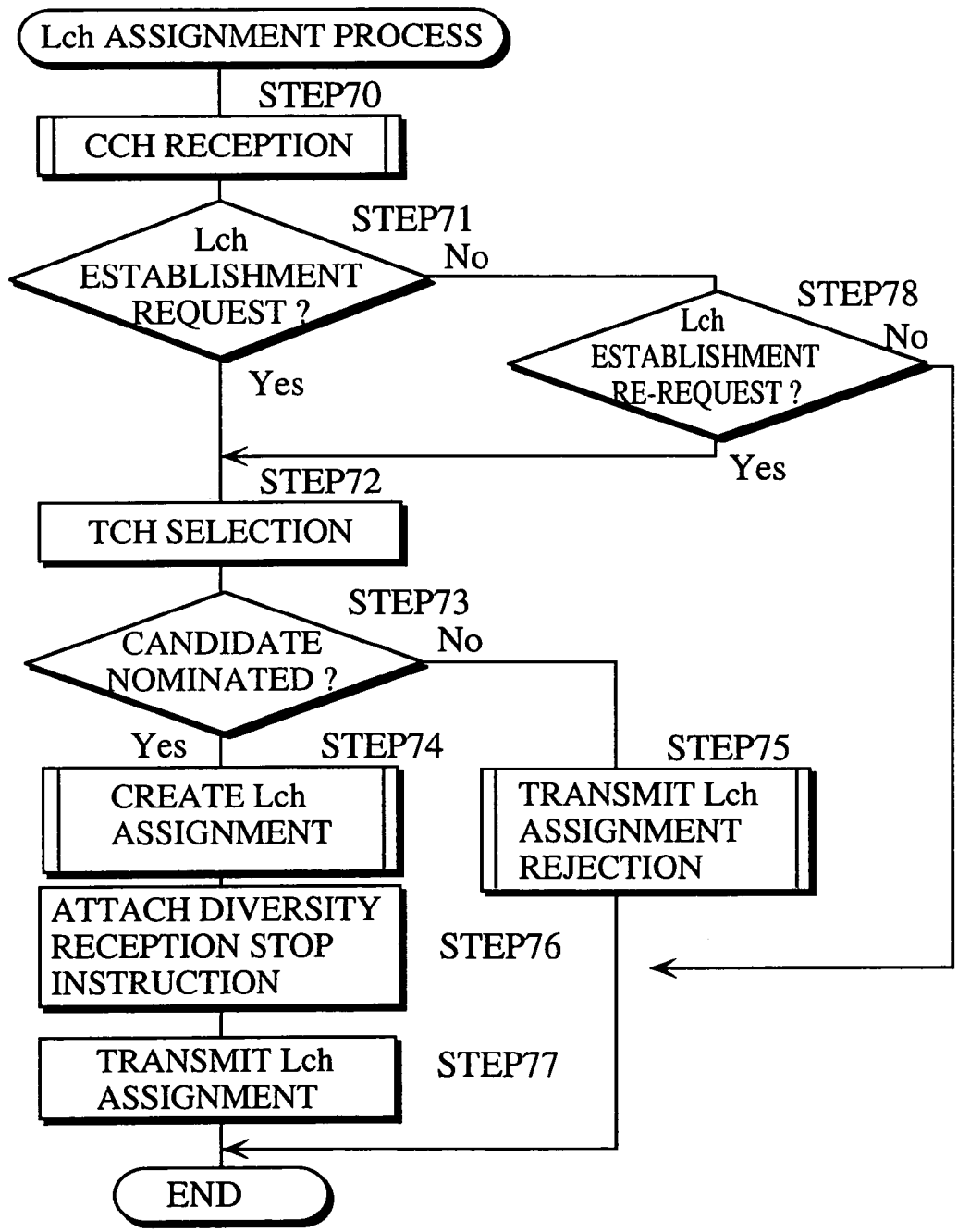
FIG. 4 is a flowchart showing the link channel assignment process of the radio base station.

FIG. 4 is a flowchart showing the Lch assignment process performed when the radio base station receives a control signal from a mobile station. After the process shown in FIG. 4 is completed, a communication through the assigned traffic channel (TCH) starts.

The control unit 80 receives the control signal from the mobile station through the radio communication unit 11, signal processing unit 50, and modem 60 with reception time slots for a control channel (step 70). This reception may be the omni or array reception.

When the received control signal is an Lch establishment request or an Lch establishment re-request (steps 71 and 78), the control unit 80 attempts to nominate a candidate for a mobile station to use a time-division-multiplexed channel or a space-division-multiplexed traffic channel not assigned for a TDMA/TDD frame (step 72).

When failing to nominate a candidate, the control unit 80 instructs the signal processing unit 50 to transmit an Lch assignment rejection message (step 75).

When succeeding in nominating a candidate, the control unit 80 creates an Lch assignment message which shows a carrier number (frequency number) of the selected traffic channel and a slot position (step 74), adds a diversity reception stop instruction to the created Lch assignment message (step 76), and then transmits the Lch assignment message (step 77).

Diversity Reception Stop Instruction

FIG. 5 shows an example of an Lch assignment message. As shown in FIG. 5, the Lch assignment message is composed of five octets, where the octet "5" includes only two bits. These octets conform to the PHS standard and will not be described in detail, except for the bit "6" of the octet "3" (hereinafter referred to as a D flag). When being "1", the D flag indicates a diversity reception stop instruction against the mobile station; and when being "0", the D flag indicates that a diversity reception is possible, namely, that either a diversity reception or a reception using one antenna is possible.

As described above, the radio base station of the present embodiment transmits a diversity reception stop instruction to a mobile station when it starts a radio communication with the mobile station using a traffic channel. With this construction, the radio base station can allow a plurality of mobile stations to stop the diversity reception and perform a reception using one antenna while performing radio communications with the plurality of mobile stations with the space division multiplex.

Construction of Mobile Station

Figure 6:
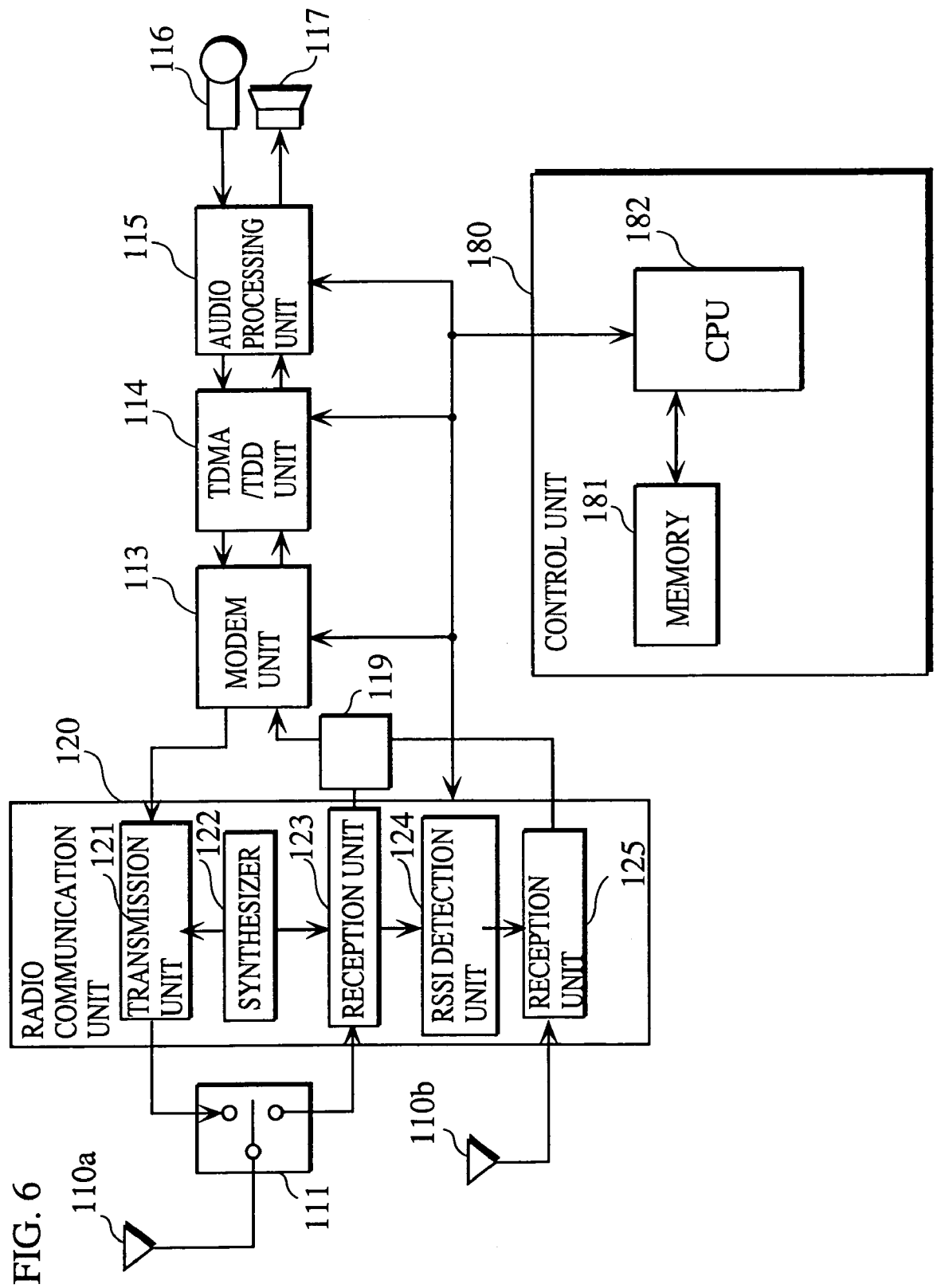
FIG. 6 is a block diagram showing the construction of the mobile station in the present embodiment.

FIG. 6 is a block diagram showing the construction of the mobile station in the present embodiment. The mobile station includes antennas 110a and 110b, a transmission/reception switch unit 111, a radio communication unit 120, a modem unit 113, a TDMA/TDD unit 114, an audio processing unit 115, a microphone 116, a speaker 117, a switch 119, and a control unit 180. When receiving a diversity reception stop instruction from the radio base station, the mobile station stops a diversity reception with two antennas, and starts a one-antenna reception.

In FIG. 6, a circuit including the antennas 110a, 110b, transmission/reception switch unit 111, radio communication unit 120, modem unit 113, TDMA/TDD unit 114, audio processing unit 115, microphone 116, speaker 117, and switch 119 has a general construction of a TDMA/TDD mobile communication unit, and performs, for example, a TDMA/TDD radio communication conforming to a PHS standard "RCR STD-28".

The antennas 110a, 110b are a whip antenna and an embedded antenna, respectively. In this case, the antenna 110a is used for transmission and the antennas 110a, 110b are used for reception.

The switch 119, during a diversity reception under control of the control unit 180, selects a higher-level reception signal among (1) a reception signal obtained from the antenna 110a via the reception unit 123 and (2) a reception signal obtained from the antenna 110b via the reception unit 125, and outputs the selected reception signal to the modem unit 113. During a reception other than a diversity reception, the switch 119 fixedly selects a reception signal from the reception unit 123 and outputs the reception signal to the modem unit 113.

The control unit 180 includes a memory 181 and a CPU 182. The CPU 182 executes a program stored in the memory 181, allowing the control unit 180 to control the entire mobile station. Especially, when the mobile station receives a diversity reception stop instruction from the radio base station, the control unit 180 allows the switch 119 to connect to the reception unit 123 until the telephone conversation ends.

Lch Establishment in Mobile Station

Figure 7:
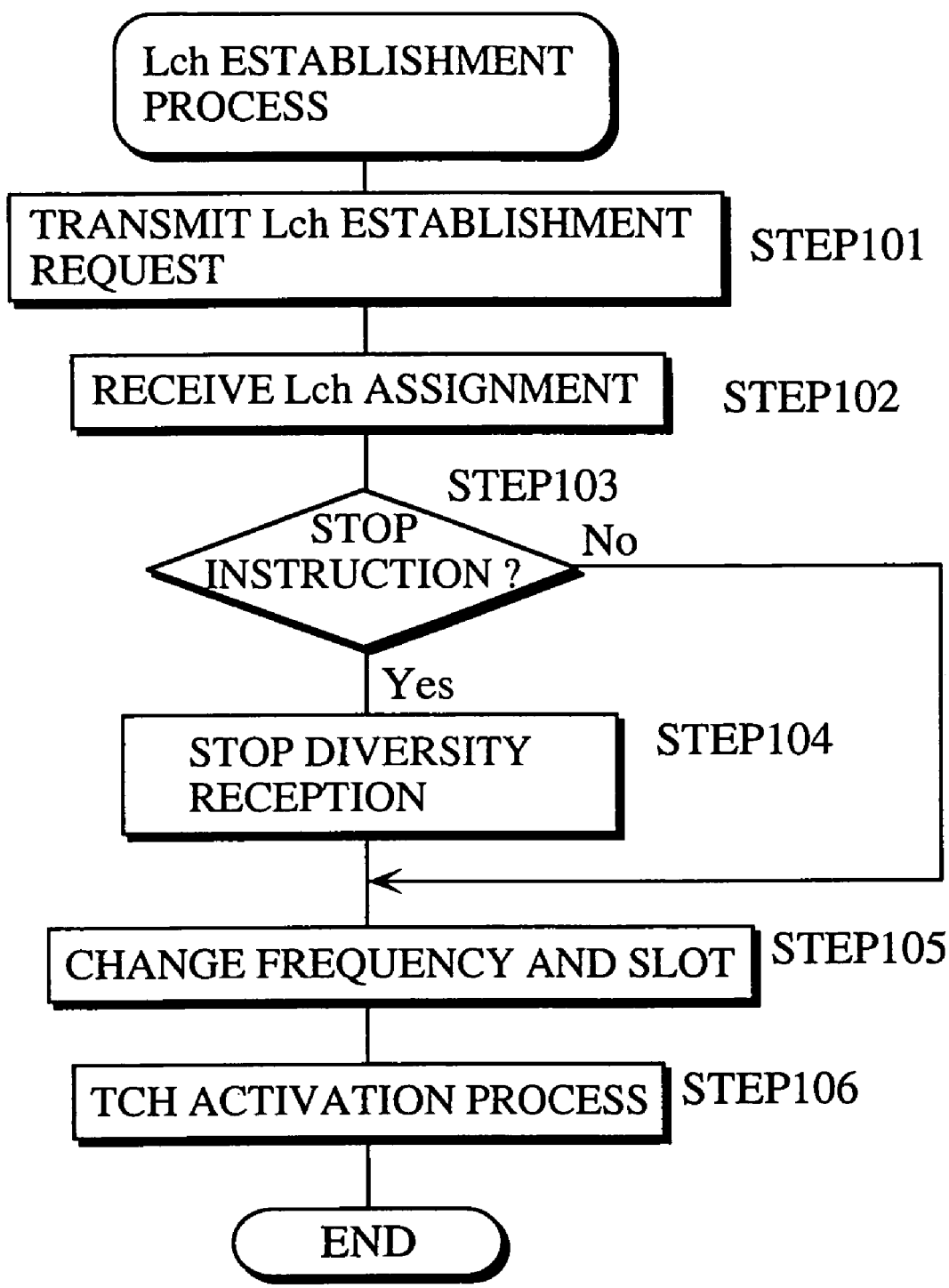
FIG. 7 is a flowchart showing a link channel establishment process in the mobile station.

FIG. 7 is a flowchart showing an Lch establishment process in the mobile station. The Lch establishment process is performed when a control channel is switched to a traffic channel and ranges from a reception of an assignment of a traffic channel from the base station to an establishment of synchronization as a preparation for a transmission/reception performed through an assigned traffic channel. The Lch establishment process is performed (1) when the mobile station originates a call on a CCH in wait reception state (idle state), (2) when the mobile station receives a call from the base station on a CCH in the idle state, (3) when the mobile station attempts to change the current base station to a hand-over destination base station, or (4) when the mobile station newly registers its position.

In this process, the control unit 180 first transmits an Lch establishment request to the radio base station through a control channel (step 101), receives an Lch assignment transmitted from the radio base station through a control channel in response to the Lch establishment request (step 102), judges whether the received Lch establishment includes a diversity reception stop instruction (step 103), and when it includes a diversity reception stop instruction, stops a diversity reception (step 104). More specifically, the control unit 180 keeps the switch 119 connected to the reception unit 123 after the mobile station receives the stop instruction until the conversation ends.

After the diversity reception stops or after judging that the received Lch establishment does not include a diversity reception stop instruction, the control unit 180 switches the current channel to a traffic channel specified in the Lch assignment (step 105), activates the traffic channel (step 106), and enters a communication state.

As described above, the mobile station in the present embodiment, when it starts performing a radio communication through a traffic channel with a radio base station by the space division multiplex, stops the diversity reception in accordance with the diversity reception stop instruction received from the radio base station and starts performing a reception using one antenna.

Other Variations (1) In the present embodiment, the radio base station transmits an Lch assignment with a diversity reception stop instruction to a mobile station. The diversity reception stop instruction, however, may be attached to control information which is intermittently transmitted through a control channel. In this case, the mobile station receives the stop instruction from the base station together with the intermittently sent control information, and stops the diversity reception after the base station assigns a traffic channel. Alternatively, the mobile station may stop the diversity reception after it receives the stop instruction.

(2) The diversity reception stop instruction may be transmitted through a traffic channel. For example, when communicating with only one mobile station using time-division time slots, the radio base station may allow the mobile station to keep the diversity reception; and when starting communicating with the second or further mobile station, the radio base station may stop the diversity reception in terms of space-division-multiplex mobile stations.

Figures 8, 9:
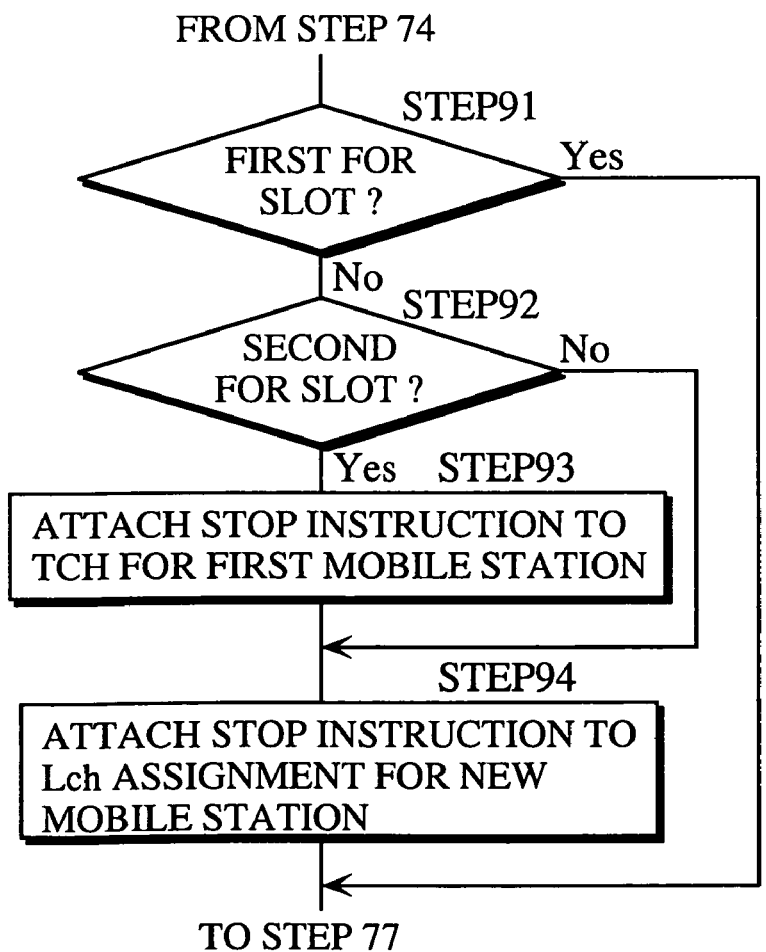
FIG. 8 shows the slot assignment table managed by the radio base station.
FIG. 9 is a flowchart showing the procedure of the stop instruction transmission by the radio base station.

In the above case, the control unit 180 refers to a slot assignment table shown in FIG. 8, and executes a process of transmitting a stop instruction according to a flowchart shown in FIG. 9.

As shown in FIG. 8, the slot assignment table show identifiers of mobile stations assigned to each time-division transmission/reception time slot. In the example shown in FIG. 8, two mobile stations with identifiers PS1 and PS4 are assigned to the transmission/reception time slots 2 and 6. The two mobile stations communicate with the radio base station by the space division multiplex. Also, a mobile station with identifier PS2 is assigned to the transmission/reception time slots 3 and 7. Each identifier is entered in the slot assignment table when a candidate is nominated in the step 72 shown in FIG. 4, and deleted after a communication is completed. It should be noted here that in FIG. 8, it is assumed that the transmission/reception time slots 1 and 5 are used as transmission/reception time slots for control channels.

As shown in FIG. 9, after creating an Lch assignment (step 74 in FIG. 4), the radio base station refers to the slot assignment table, and when the selected traffic channel is the first to be assigned to a transmission/reception time slot (step 91: "yes"), the radio base station does not attach the stop instruction. This is because since a space division multiplex is not performed at this stage, the diversity reception need not be stopped.

When the selected traffic channel is the second to be assigned (step 92: "yes"), the radio base station adds the diversity reception stop instruction to the data on the traffic channel for the first mobile station (step 93), and adds the diversity reception stop instruction to the Lch assignment created in step 74 in FIG. 4 (step 94). This is because since two mobile stations communicate with the radio base station by the space division multiplex, the diversity reception should be stopped at the two mobile stations.

When the selected traffic channel is the third to be assigned (step 92: "no"), the radio base station adds the diversity reception stop instruction to the Lch assignment created in step 74 in FIG. 4 (step 94). In this case, since the diversity reception has been stopped at each mobile station that has communicated with the radio base station by the space division multiplex, the stop instruction is transmitted to a new mobile station.

With the construction shown in FIG. 9, when a space division multiplex starts, the mobile station that is to communicate with the radio base station by the space division multiplex stops the diversity reception.

The radio base station refers to the slot assignment table shown in FIG. 8 each time a communication with a mobile station is completed. When finding that the space division multiplex has ended, that is to say, when only one mobile station is assigned to the transmission/reception time slots, the radio base station may instruct the mobile station to restart the diversity reception.

(3) In the present embodiment, it is assumed that the radio base station communicates with mobile stations by the space division multiplex. However, whether to perform communication by the space division multiplex (whether to perform the array or omni transmission/reception) may be dynamically determined according to the number of TCH changes, the number of hand-overs or the like. When the omni transmission is performed, the control unit 180 may omit the step 76 shown in FIG. 4.

(4) In the present embodiment, the radio base station has an array antenna composed of four antennas. However, the radio base station may have a different number of antennas.

(5) In the present embodiment, the present invention is applied to a radio base station for the PHS system. However, the present invention can be applied to other mobile communication systems.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A radio base station for performing a radio communication with a plurality of mobile stations, each of which has a plurality of antennas, the radio base station being configured for:
    establishing a radio connection with each of the plurality of mobile stations using a space division multiplex method; and
    when communicating with only one mobile station using time-division time slots, allowing the one mobile station to keep a diversity reception being performed in the one mobile station, and when further starting communicating with another mobile station using the space division multiplex method, transmitting a diversity reception stop instruction to the one mobile station already connected to end the diversity reception being performed in the one mobile station.

2. The radio base station of claim 1 further comprising:
    a creation means for creating a piece of traffic channel assignment information after receiving a traffic channel assignment request from the another mobile station;
    an attachment means for attaching the diversity reception stop instruction to the piece of traffic channel assignment information; and
    a transmission means for transmitting the piece of traffic channel assignment information with the diversity reception stop instruction, to the another mobile station as a response to the traffic channel assignment request.

3. The radio base station of claim 1 further comprising:

a determination means for determining, after receiving a traffic channel assignment request from the another mobile station, whether to allow the mobile station to space-division-multiplex with the one mobile station which has communicated with the radio base station;

a creation means for creating a piece of traffic channel assignment information when the determination means determines to allow the another mobile station to space-division-multiplex with the one mobile station;

an attachment means for attaching the diversity reception stop instruction to the piece of traffic channel assignment information; and a transmission means for transmitting the piece of traffic channel assignment information with the diversity reception stop instruction, to the another mobile station as a response to the traffic channel assignment request, and transmitting the diversity reception stop instruction to the one mobile station through a traffic channel.

* * * * *